(12) United States Patent
Lee

(10) Patent No.: US 11,987,076 B1
(45) Date of Patent: May 21, 2024

(54) CASTER HAVING SMOOTH 180° REVERSE ROTATION

(71) Applicant: Heon Mun Lee, Gunpo-si (KR)

(72) Inventor: Heon Mun Lee, Gunpo-si (KR)

(*) Notice: Subject to any disclaimer, the term of this patent is extended or adjusted under 35 U.S.C. 154(b) by 0 days.

(21) Appl. No.: 18/288,381

(22) PCT Filed: Oct. 26, 2022

(86) PCT No.: PCT/KR2022/016418
§ 371 (c)(1),
(2) Date: Oct. 26, 2023

(87) PCT Pub. No.: WO2023/075390
PCT Pub. Date: May 4, 2023

(30) Foreign Application Priority Data

Nov. 1, 2021 (KR) .................. 10-2021-0148652

(51) Int. Cl.
*B60B 33/00* (2006.01)
(52) U.S. Cl.
CPC .................. *B60B 33/0068* (2013.01)
(58) Field of Classification Search
CPC .............. B60B 33/0076; B60B 33/006; B60B 33/0065; B60B 33/0005; B60B 33/0018; B60B 33/0028; B60B 33/0049; B60B 33/0068
See application file for complete search history.

(56) References Cited

U.S. PATENT DOCUMENTS

| | | | | |
|---|---|---|---|---|
| 4,342,134 A * | 8/1982 | Mickelson | .......... | B60B 33/0042 16/31 R |
| 4,494,271 A * | 1/1985 | Perlin | .................. | B60B 33/0002 384/453 |
| 5,983,451 A * | 11/1999 | Shouldice | ............... | B60B 33/08 16/21 |
| 8,387,209 B2 * | 3/2013 | Aubin | ................. | B60B 33/0073 16/48 |
| 9,051,965 B1 * | 6/2015 | Spektor | .................... | F16C 43/06 |
| 2002/0069480 A1 * | 6/2002 | Looker | ............... | B60B 33/0073 16/46 |
| 2005/0005394 A1 * | 1/2005 | Adam | ................. | B60B 33/0068 16/18 R |

(Continued)

FOREIGN PATENT DOCUMENTS

| | | |
|---|---|---|
| JP | 63-170102 A | 7/1988 |
| JP | 04159102 A * | 6/1992 |

(Continued)

OTHER PUBLICATIONS

International Search Report for PCT/KR2022/016418 mailed Feb. 16, 2023 from Korean Intellectual Property Office.

*Primary Examiner* — Chuck Y Mah
(74) *Attorney, Agent, or Firm* — Revolution IP, PLLC

(57) ABSTRACT

The present invention relates to a caster, and particularly, to a caster which more smoothly rotates when reversely rotating 180° and effectively supports a weight of an object disposed on the caster to smoothly rotate in reverse without any shaking, wherein the caster has a structure in which a central portion, a connecting part, and a lower body part are sequentially provided under a support plate formed in an upper end portion of the caster, and in particular, a rotating part is mounted between the connecting part and the central portion.

1 Claim, 5 Drawing Sheets

(56) References Cited

U.S. PATENT DOCUMENTS

2006/0059656 A1* 3/2006 Hackett .............. B60B 33/0021
                                                      16/20
2010/0247281 A1* 9/2010 Kempf ................ B60B 33/0015
                                                      16/45

FOREIGN PATENT DOCUMENTS

| JP | 05-026507 U | | 4/1993 | |
|----|----|----|----|----|
| JP | 2013151287 A | * | 8/2013 | ......... B60B 33/0005 |
| JP | 6129172 B2 | | 5/2017 | |
| KR | 10-2008-0037455 A | | 4/2008 | |
| KR | 20-0492330 Y1 | | 9/2020 | |

* cited by examiner

【Figure 2】
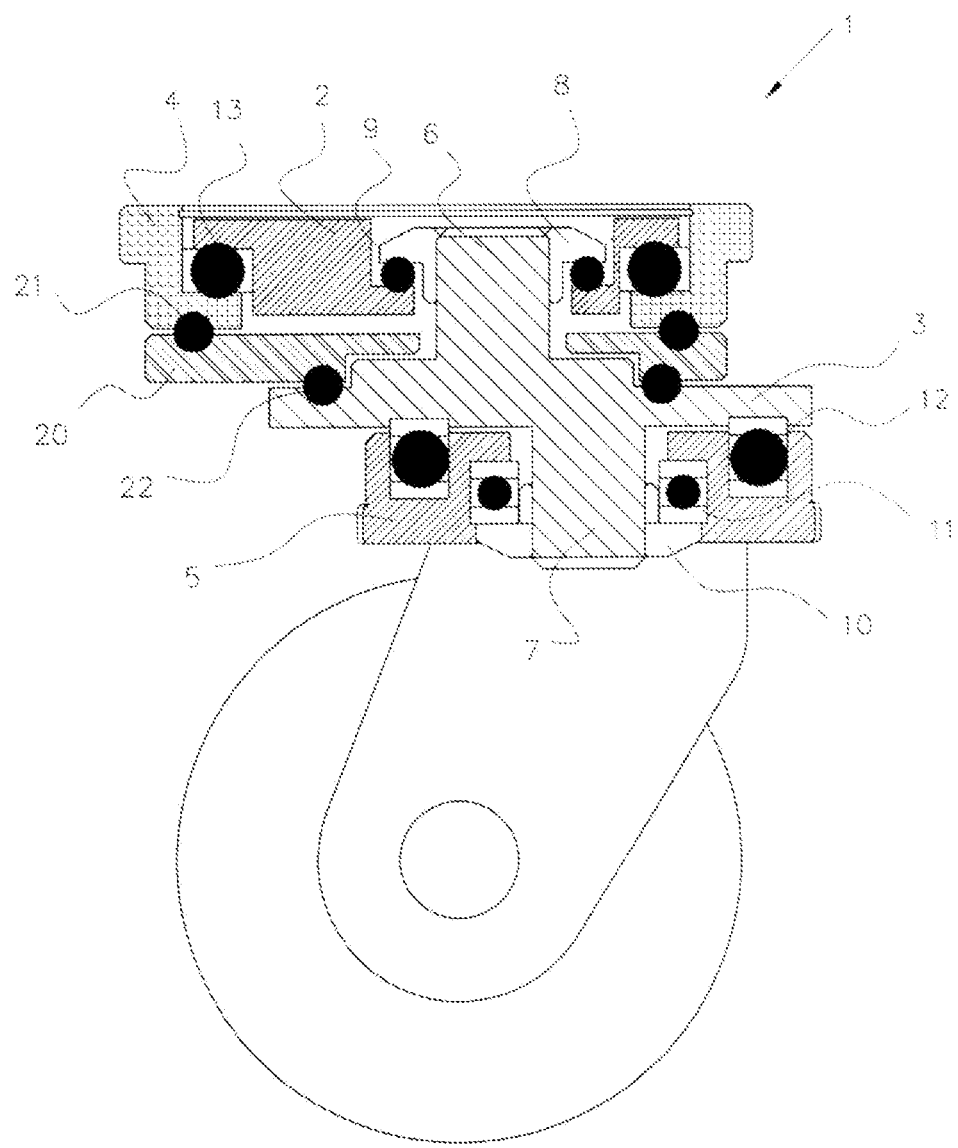

【Figure 3】
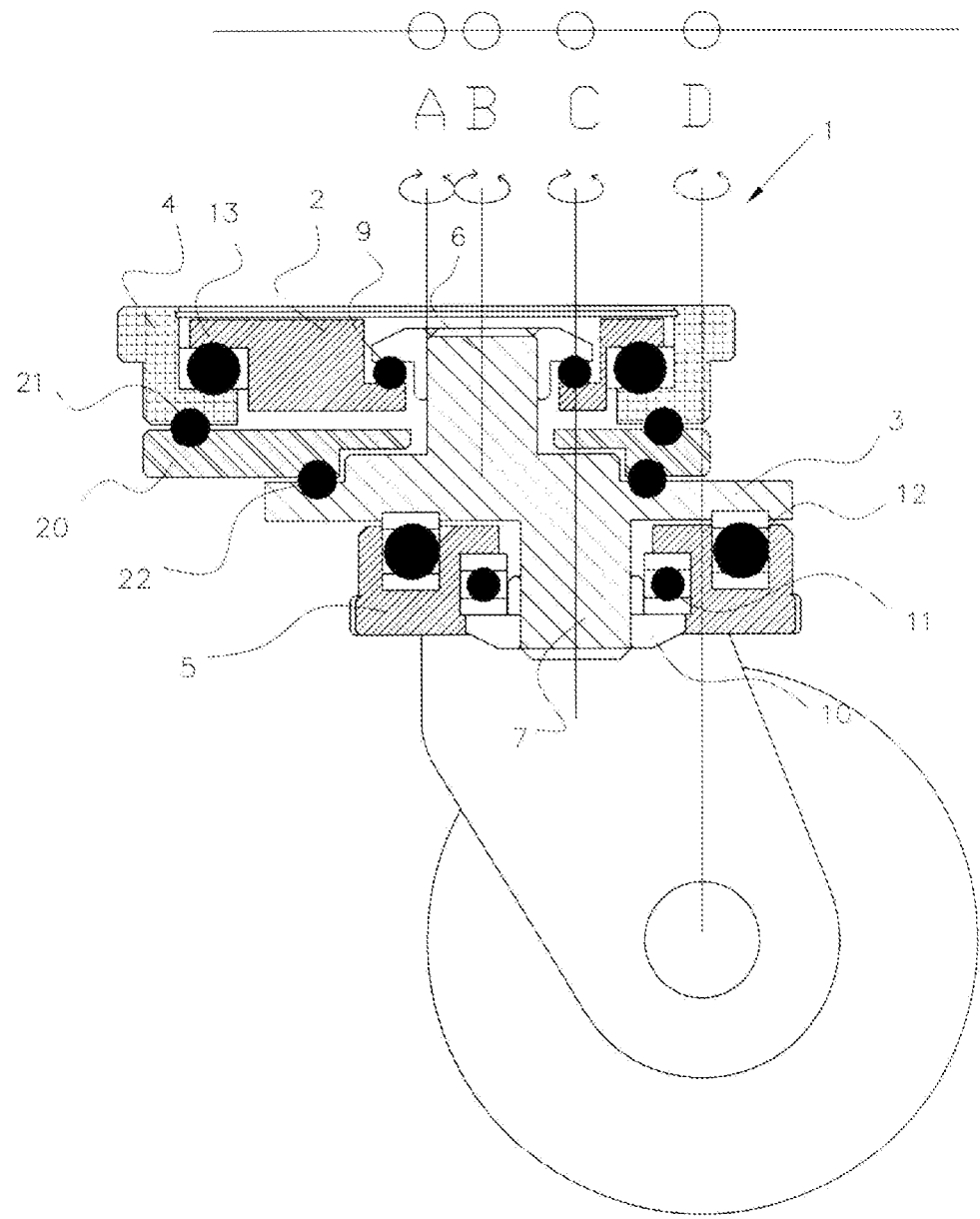

【Figure 4】
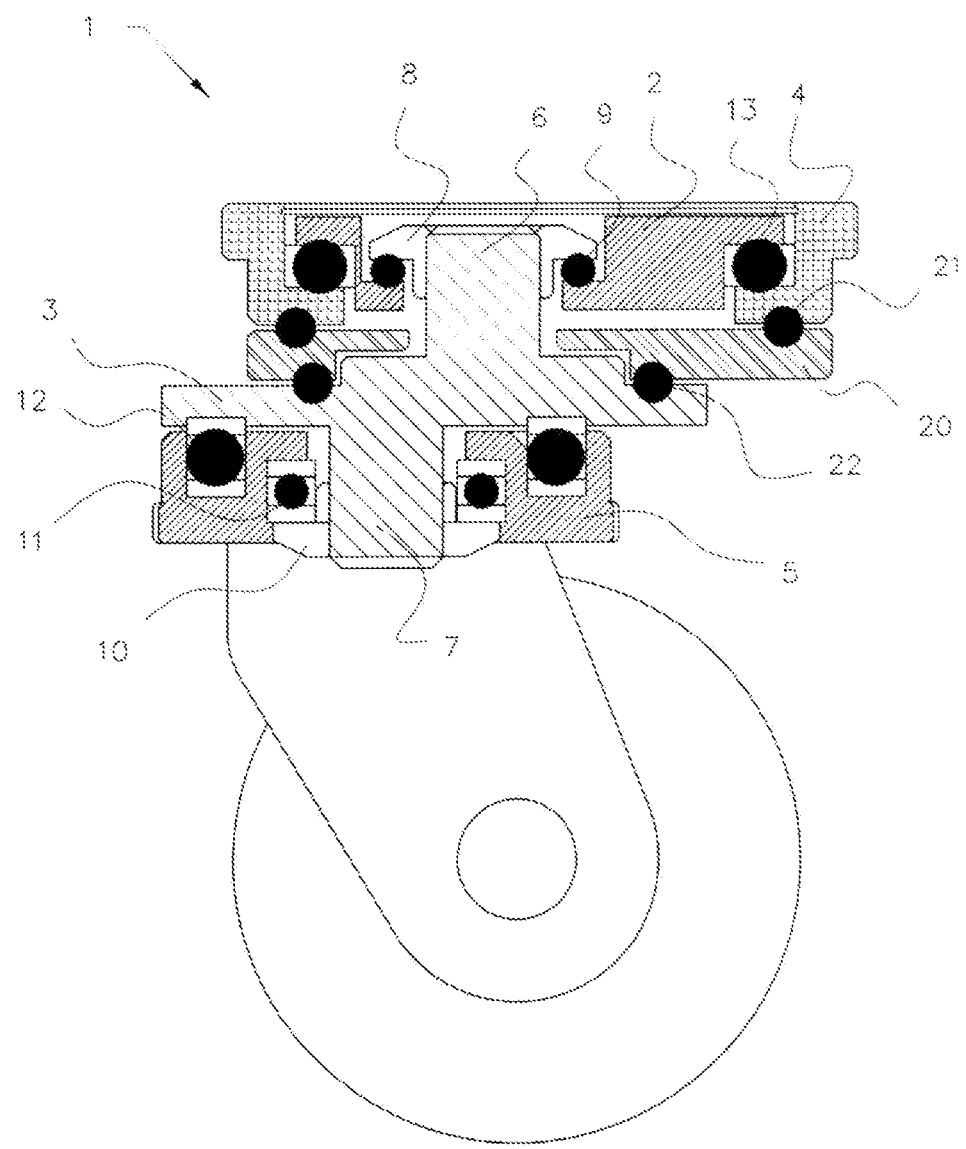

[Figure 5]
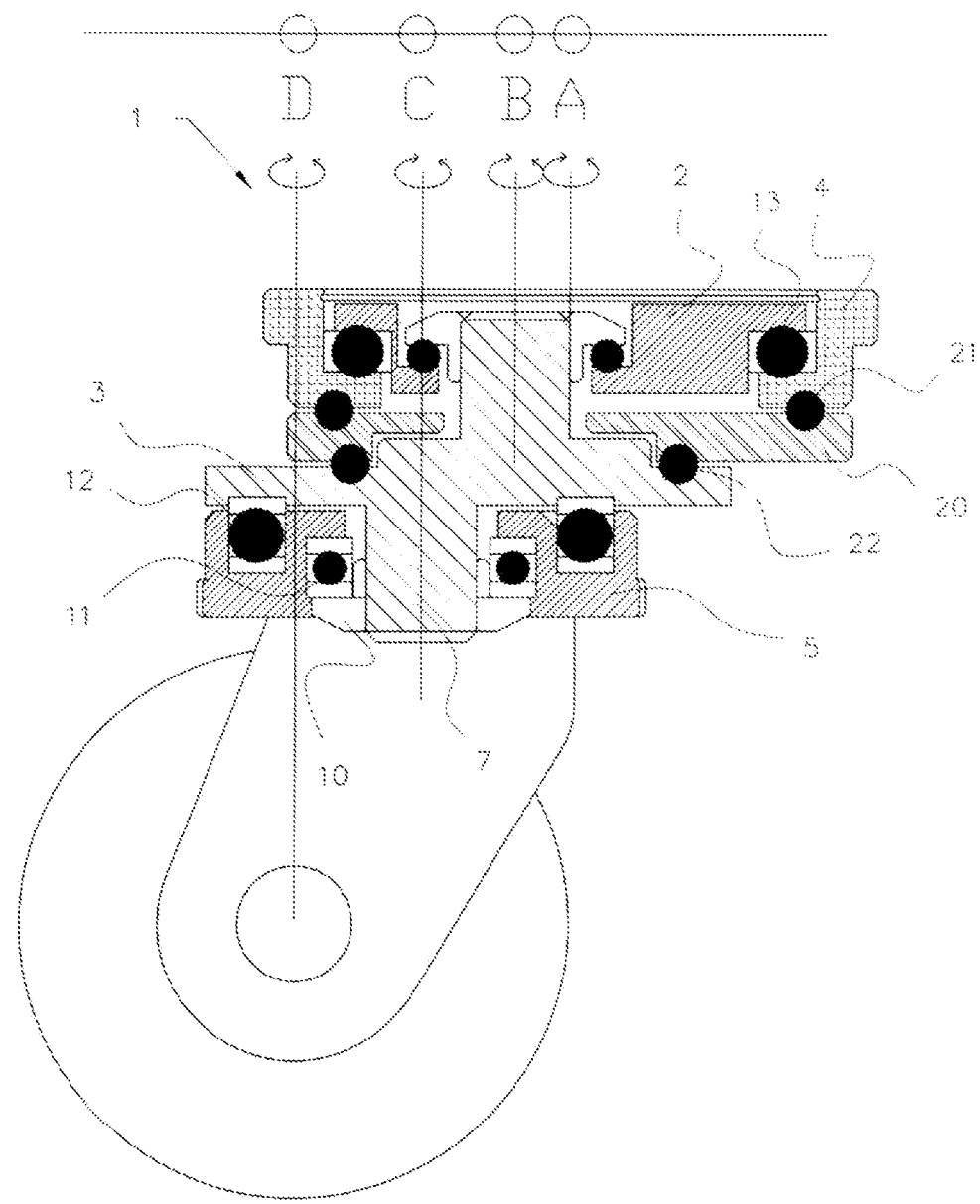

CASTER HAVING SMOOTH 180° REVERSE ROTATION

TECHNICAL FIELD

The present invention relates to a caster, and more particularly, to a caster which more smoothly rotates when reversely rotating 180° and effectively supports a weight of an object disposed on the caster to smoothly rotate in reverse without any shaking.

BACKGROUND ART

In general, a caster is mounted on a lower end portion of a relatively heavy product such as a workbench, refrigerator, or washing machine and overloaded when moving a particularly heavy product at 180° in reverse, and thus there is a problem that the caser breaks when used for a long time.

Utility model registration application No. 20-2019-0001608 had been applied in advance.

Specifically, an overall structure is mainly formed as four units including a first panel 211, a second panel 213, a caster panel 221, and a caster body 223.

Since four units are provided, there are problems that an interconnection structure is complicated and the assembly method is difficult.

In particular, since a second bearing 217 and a fourth bearing 226 are equipped with ball bearings which help to rotate laterally, there is a problem that a weight applied from above is not effectively supported.

When such a caster is used for a long time, there are problems that a weight applied from above cannot be effectively supported, and damage to the caster occurs.

Technical Problem

Accordingly, the present invention is directed to solving such problems.

A caster on which a plurality of ball bearings are mounted to smoothly move using a small force and support a weight on the caster when moving straight and then turning at a certain angle, or particularly, and reversely rotating 180° to move in a reverse direction is provided.

In addition, a caster which precisely safely moves a product on the caster because vibrations of the caster are minimized and increases a lifetime by supporting a weight of the product on the caster is provided.

Technical Solution

One aspect of the present invention provides a caster having a structure in which a central portion, a connecting part, and a lower body part are sequentially provided under a support plate formed in an upper end portion of the caster, and in particular, a rotating part is mounted between the connecting part and the central portion.

In particular, six thrust ball bearings are mounted between the support plate, the central portion, the connecting part, the rotating part, and the lower body part so that the caster may rotate smoothly when the caster linearly moves and then changes a direction to rotate at a certain angle, or in particular, when reversely rotates 180° and then moves in a reverse direction.

A rotating part is additionally added between the connecting part and the central portion, and six thrust ball bearings are mounted so that the caster may rotate more smoothly when reversely rotating 180°.

As described above, when the caster changes a direction to rotate or reversely rotates 180°, in a case in which central axes between an upper pillar part and a lower pillar part, the thrust ball bearings, and a wheel are collinear with each other, the rotation is not performed properly, and the caster is overloaded.

The present invention is directed to solving such problems.

The rotating part is added between the connecting part and the central portion, the thrust ball bearing is additionally mounted between the connecting part and the rotating part, and the thrust ball bearing is additionally mounted between the rotating part and the central portion.

As described above, the rotating part is additionally installed so that a state in which the central axes between the upper pillar part and the lower pillar part formed in the central portion, the thrust ball bearings, and the wheel are collinear with each other may be easily changed, and thus, when the caster changes a direction or reversely rotates 180°, an overload is prevented.

In addition, six thrust ball bearings are mounted in the caster to dispersedly support a weight from above the caster, and thus the durability of the thrust ball bearings may be improved.

Advantageous Effects

As described above, in the present invention, when the caster linearly moves and then changes a direction to rotate or reversely rotates 180° and then moves in a reverse direction, vibrations of a caster can be reduced to safely move an object on the caster, and a rotating part is additionally mounted between six thrust ball bearings to support a weight on the caster.

As described above, the caster is improved so that central axes between an upper pillar part and a lower pillar part formed in a central portion, the thrust ball bearings, and a wheel, which are collinear with each other, can be easily changed, and thus the caster can rotate more smoothly.

Accordingly, a product on the caster can be moved precisely, vibration can be minimized, and the rotating part is added to support a weight of the product applied to the caster so that a lifetime of the product can be increased.

DESCRIPTION OF DRAWINGS

FIG. 2 is a longitudinal cross-sectional view of an entire caster of the present invention.

FIG. 3 is a view illustrating an example in which a wheel, an upper pillar part, and a lower pillar part of the present invention are collinear with each other.

FIG. 4 is a longitudinal cross-sectional view of the caster of the present invention when positioned in an opposite direction.

FIG. 5 is a view of an example in which the wheel, the upper pillar part, and the lower pillar part are collinear with each other when the caster of the present invention is positioned in the opposite direction.

MODES OF THE INVENTION

Figure 1:
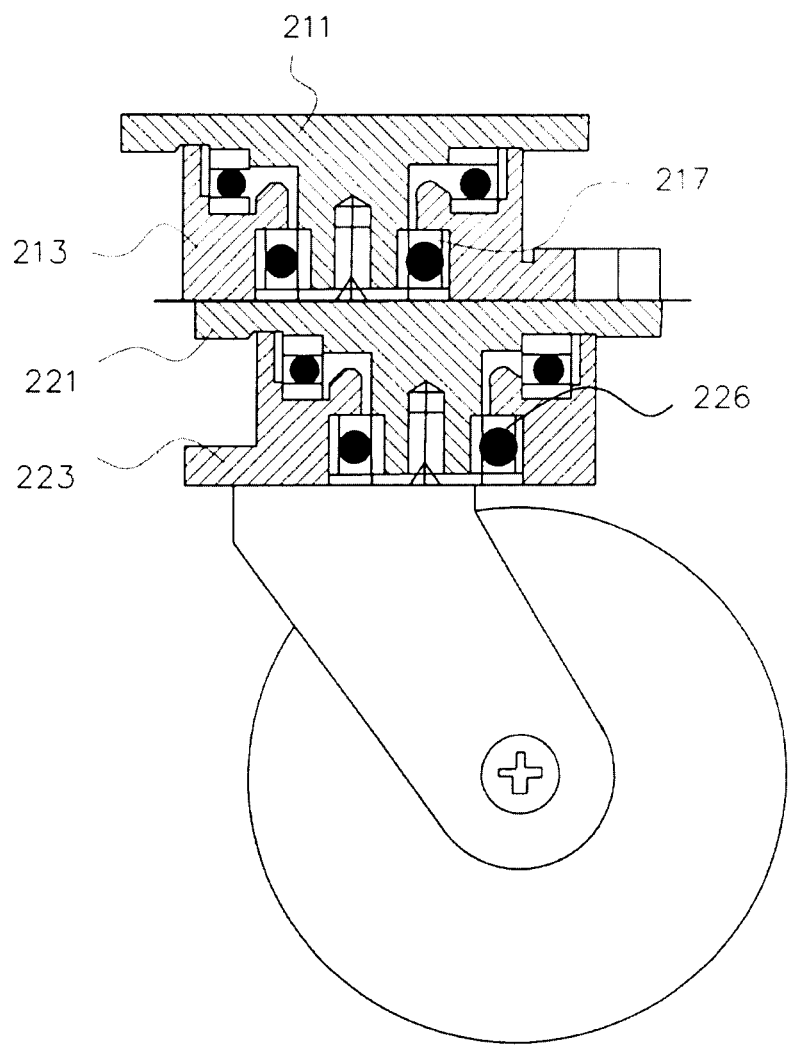
FIG. 1 is a longitudinal cross-sectional view of an entire conventional caster.

A support plate 2 formed in an upper end portion of a caster 1, and a central portion 3, a connecting part 4, and a lower body part 5 which are disposed under the support plate 2 are sequentially mounted.

The central portion 3 includes an upper pillar part 6 and a lower pillar part 7, and the upper pillar part 6 and the lower pillar part 7 are disposed diagonally.

A central portion of the support plate 2 and the upper pillar part 6 are fixed using an upper nut 8.

A thrust ball bearing 9 is mounted between the support plate 2 and the upper nut 8 so that the support plate 2 and the upper nut 8 may rotate freely.

The lower body part 5 and the lower pillar part 7 are fixed using a lower nut 10, and a thrust ball bearing 11 is mounted between the lower body part 5 and the lower nut 10.

A thrust ball bearing 12 is mounted between an outer upper surface of the lower body part 5 and an outer lower surface of the central portion 3 so that the lower body part 5 and the central portion 3 may rotate freely.

The connecting part 4 is mounted on the outside of the support plate 2, and a thrust ball bearing 13 is mounted between the support plate 2 and the connecting part 4.

In the present invention, the caster 1 rotates more smoothly when the caster 1 rotates 180° in reverse.

A rotating part 20 is mounted between a lower side of the connecting part 4 and an outer side of the central portion 3, a thrust ball bearing 21 is mounted between the connecting part 4 and the rotating part 20, and a thrust ball bearing 22 is mounted between the rotating part 20 and the central portion 3.

As described above, the caster 1 includes five units including the support plate 2, the central portion 3, the connecting part 4, the rotating part 20, and the lower body part 5, and the five units are interconnected through the six thrust ball bearings 9, 11, 12, 13, 21, and 22.

In the present invention, when central axes between the upper pillar part 6 and the lower pillar part 7 formed in the central portion 3, a plurality of thrust ball bearings 9, 11, 12, 13, 21, and 22, and a wheel are collinear with each other, a large load can be minimized.

In addition, when the caster 1 changes a direction to move in any direction or reversely rotates 180°, the six thrust ball bearings 9, 11, 12, 13, 21, and 22 may move individually so that the caster 1 rotates smoothly to reduce vibrations of the caster 1.

When the caster 1 rotates, the caster may rotate more smoothly and reduce a load generated when rotating to rotate smoothly using a small force.

As described above, since six thrust ball bearings 9, 11, 12, 13, 21, and 22 are mounted, the upper pillar part 6 and the lower pillar part 7 formed in the central portion 3 may allow a state in which the central axes between the thrust ball bearings 9, 11, 12, 13, 21, and 22 and the wheel, which are collinear with each other, are easily changed, and thus, when the caster 1 reversely rotates 180°, the caster 1 can rotate more smoothly.

In addition, since six thrust ball bearings 9, 11, 12, 13, 21, and 22 are mounted to dispersedly support a weight applied from above the caster 1, the durability of the thrust ball bearings can be improved.

A, B, C, and D expressed in FIGS. 3 and 5 represent central axes of components.

A represents a central axis between the thrust ball bearings 12 and 21, B represents a central axis between the upper pillar part 6 and the thrust ball bearings 9 and 22, C represents a central axis between the lower pillar part 7 and the thrust ball bearings 11 and 12, and D represents the central axis of the wheel.

The invention claimed is:

1. A caster which smoothly rotates 180° in reverse, the caster comprising:
a support plate (2) formed in an upper end portion of a caster (1); and
a central portion (3), a connecting part (4), and a lower body part (5), which are disposed under the support plate (2), are sequentially mounted;
wherein the central portion (3) includes an upper pillar part (6) and a lower pillar part (7), and the upper pillar part (6) and the lower pillar part (7) are disposed diagonally,
a central portion of the support plate (2) and the upper pillar part (6) are fixed using an upper nut (8),
a thrust ball bearing (9) is mounted between the support plate (2) and the upper nut (8),
the lower body part (5) and the lower pillar part (7) are fixed using a lower nut (10), and a thrust ball bearing (11) is mounted between the lower body part (5) and the lower nut (10),
a thrust ball bearing (12) is mounted between an outer upper surface of the lower body part (5) and an outer lower surface of the central portion (3),
the connecting part (4) is mounted on an outside of the support plate (2),
a thrust ball bearing (13) is mounted between the support plate (2) and the connecting part (4),
a rotating part (20) is mounted between a lower side of the connecting part (4) and an outer side of the central portion (3),
a thrust ball bearing (21) is mounted between the connecting part (4) and the rotating part (20), and
a thrust ball bearing (22) is mounted between the rotating part (20) and the central portion (3).

\* \* \* \* \*